United States Patent
Hsu

(10) Patent No.: US 8,602,659 B2
(45) Date of Patent: Dec. 10, 2013

(54) OPTICAL FIBER CONNECTOR

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/562,295

(22) Filed: Jul. 30, 2012

(65) Prior Publication Data

US 2013/0272659 A1    Oct. 17, 2013

(30) Foreign Application Priority Data

Apr. 16, 2012    (TW) .............................. 101113536 A

(51) Int. Cl.
*G02B 6/00*    (2006.01)
*G02B 6/38*    (2006.01)

(52) U.S. Cl.
USPC ........................................ 385/74; 385/147

(58) Field of Classification Search
USPC .................. 385/31, 32, 33, 74, 81, 83, 147
See application file for complete search history.

(56) References Cited

U.S. PATENT DOCUMENTS

| | | | | |
|---|---|---|---|---|
| 4,268,112 | A * | 5/1981 | Peterson | 385/61 |
| 4,767,180 | A * | 8/1988 | Zajac et al. | 385/62 |
| 4,893,890 | A * | 1/1990 | Lutes | 385/27 |
| 5,082,343 | A * | 1/1992 | Coult et al. | 385/34 |
| 5,195,155 | A * | 3/1993 | Shimaoka et al. | 385/90 |
| 5,574,595 | A * | 11/1996 | Kurata et al. | 359/484.04 |
| 5,689,360 | A * | 11/1997 | Kurata et al. | 359/281 |
| 6,783,283 | B2 * | 8/2004 | Nishita | 385/92 |
| 6,856,728 | B2 * | 2/2005 | Zhang | 385/33 |
| 7,068,883 | B2 * | 6/2006 | Ludington et al. | 385/33 |
| 2010/0226612 | A1 * | 9/2010 | Sedio et al. | 385/93 |
| 2010/0303420 | A1 * | 12/2010 | Lin et al. | 385/74 |
| 2013/0051732 | A1 * | 2/2013 | Yu et al. | 385/74 |

* cited by examiner

*Primary Examiner* — Akm Enayet Ullah
(74) *Attorney, Agent, or Firm* — Altis Law Group, Inc.

(57) ABSTRACT

An optical fiber connector includes a connector body, two optical fibers, two lenses, and a cover. The connector body includes an optical fiber receiving member defining a recess with an open end and an optical lens member assembled in the recess. The optical lens member has a first surface and a second surface. The optical fibers are received in the optical fiber receiving member. The lenses are formed on the first surface and coupled with the respective optical fibers. The cover includes an engaging member and two shielding members. The engaging member is received in the recess. Each shielding member includes a first plate extending from the engaging member and a second plate perpendicularly extending from the first plate. The first plate covers the optical lens member, and the second plate shields the corresponding lens.

12 Claims, 4 Drawing Sheets

OPTICAL FIBER CONNECTOR

BACKGROUND

1. Technical Field

The present disclosure relates to optics and, particularly, to an optical fiber connector.

2. Description of Related Art

Two optical fiber connectors are coupled together for data transmission between electronic devices due to their high transmission speed and signal integrity. Generally, each optical fiber connector includes a number of lenses and a number of optical fibers aligned with the lenses. When coupling two optical fiber connectors together, a lens in a first optical fiber connector aligns with a corresponding lens in a second optical fiber connector to ensure the optical transmittance. However, when the first optical fiber connector is detached from the second optical fiber connector, the lenses are easily broken and contaminated as the lenses are exposed to the external environment. This decreases transmission efficiency and degrades signal integrity.

Therefore, it is desirable to provide an optical fiber connector, which can overcome or at least alleviate the limitations described.

DETAILED DESCRIPTION

Figure 1:
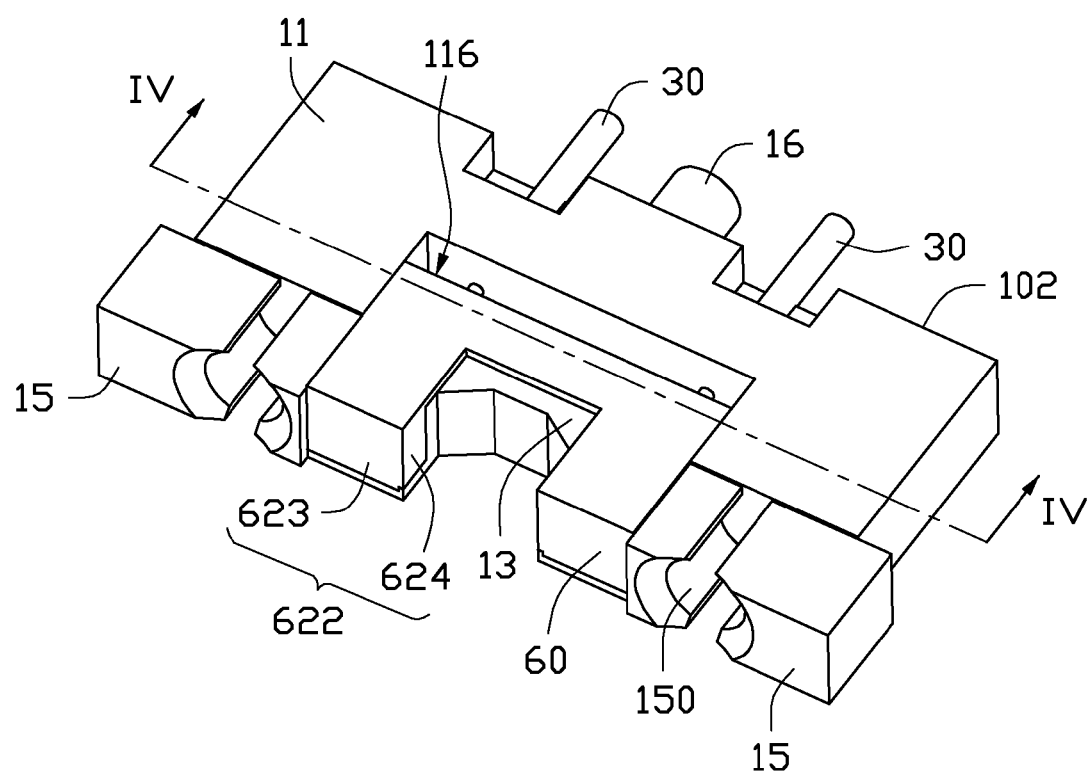
FIG. 1 is a schematic, isometric view of an optical fiber connector, according to an exemplary embodiment.
Figure 2:
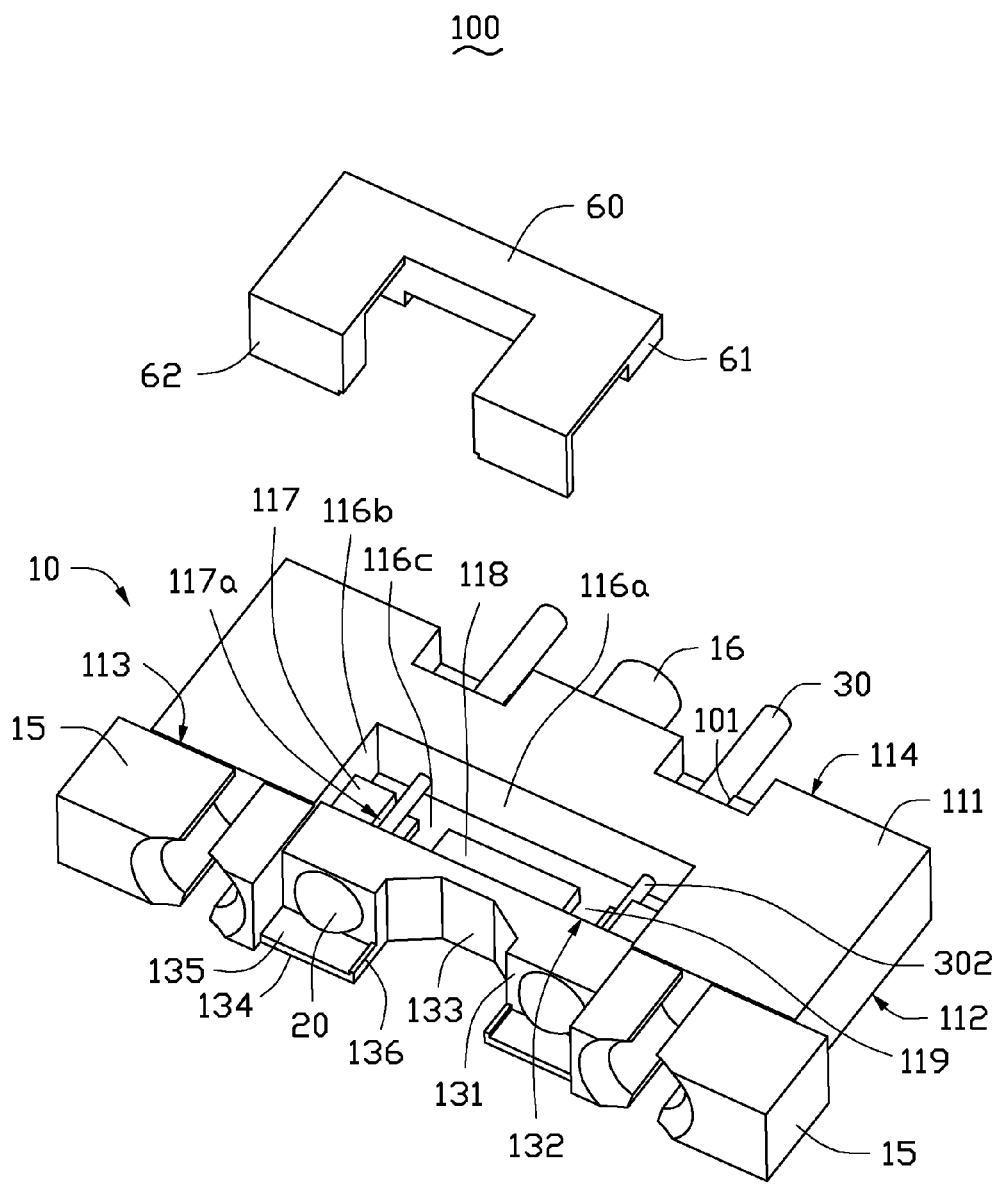
FIG. 2 is an exploded view of the optical fiber connector of FIG. 1.

FIGS. 1-2 illustrate an optical fiber connector 100 in accordance to an exemplary embodiment. The optical fiber connector 100 includes a connector body 10, two lenses 20, two optical fibers 30, and a cover 60.

The connector body 10 includes an optical fiber receiving member 11, an optical lens member 13, two plug members 15, a handle 16, two supporting members 117, and an isolating plate 118.

The optical fiber receiving member 11 is substantially a transparent cube and includes an upper surface 111, a lower surface 112, a front surface 113, and a rear surface 114. The upper surface 111 is substantially parallel to the lower surface 112. The front surface 113 is substantially parallel to the rear surface 114. The upper surface 111 perpendicularly connects the front surface 113 to the rear surface 114. The lower surface 112 perpendicularly connects the front surface 113 to the rear surface 114.

The upper surface 111 defines a recess 116. The recess 116 is exposed to the front surface 113. That is, the recess 116 has an open end at the front surface 113. The optical fiber receiving member 11 includes a first side surface 116a, two second side surfaces 116b, and a bottom surface 116c in the recess 116. The first side surface 116a and the second side surfaces 116b perpendicularly extend from the bottom surface 116c. The first side surface 116a is parallel to the rear surface 114 and arranged between the two second side surfaces 116b. The first side surface 116a perpendicularly connects a second side surface 116b to another second side surface 116b. The rear surface 114 defines two through holes 101 for receiving the two optical fibers 30 respectively. The through holes 101 communicate with the recess 116. The through holes 101 are parallel to each other and are respectively aligned with the two lenses 20.

The optical lens member 13 is made of transparent material and connected to the optical fiber receiving member 11 by adhering opposite sides of the optical lens member 13 to the two side surfaces 116b. In this embodiment, the optical lens member 13 is recessed relative to the upper surface 111.

The optical lens member 13 is U-shaped and includes a first surface 131 and a second surface 132. The first surface 131 and the second surface 132 are positioned at opposite sides of the optical lens member 13. The first surface 131 faces away from the recess 116. The second surface 132 is adjacent to the recess 116. A cutout 133 is defined in the middle of the first surface 131. Two support portions 134 extend from a lower end of the first surface 131 and are symmetrical to each other relative to the cutout 133. Each support portion 134 includes a support plate 135 and an engaging plate 136. The engaging plate 136 extends from a side of the support plate 135 adjacent to the cutout 133.

The plug members 15 extend from the front surface 113 and are adhered to opposite sides of the optical lens member 13. A plug hole 150 is defined in each plug member 15 away from the front surface 113. Two plugs (not shown) of another optical fiber connector (not shown) plug into the plug holes 150 so that the two optical fiber connector are coupled together.

The handle 16 extends from the rear surface 114 away from the recess 116. The handle 16 is configured for being held by a user when coupling the optical fiber connector 100 with another optical fiber connector (not shown).

The supporting members 117 are received in the recess 116 and extend from the bottom surface 116c. The supporting members 117 are arranged at opposite sides of the recess 116 and contact with the second side surfaces 116b. The supporting members 117 are aligned with the respective through holes 101 and the respective lenses 20. In one embodiment, each supporting member 117 defines an L-shaped positioning portion 117a.

The isolating plate 118 is received in the recess 116 and extends from the bottom surface 116c. The isolating plate 118 is arranged between the two supporting members 117 and is apart from the supporting members 117 so that two gaps 119 are formed. In this embodiment, the supporting members 117, the isolating plate 118, and the optical fiber receiving member 11 are formed into a unitary piece.

The lenses 20 are formed on the first surface 131 and arranged above the support portions 134. The lenses 20 are aligned with the respective supporting members 117.

Each of the optical fibers 30 has a distal portion 302 exposed in the recess 116. When the optical fiber 30 is inserted into the through hole 101, the distal portion 302 is supported on the corresponding supporting member 117. A light emitting surface of each of the optical fiber 30 contacts the optical lens member 13 and are aligned and optically coupled with the corresponding lens 20.

Figure 3:
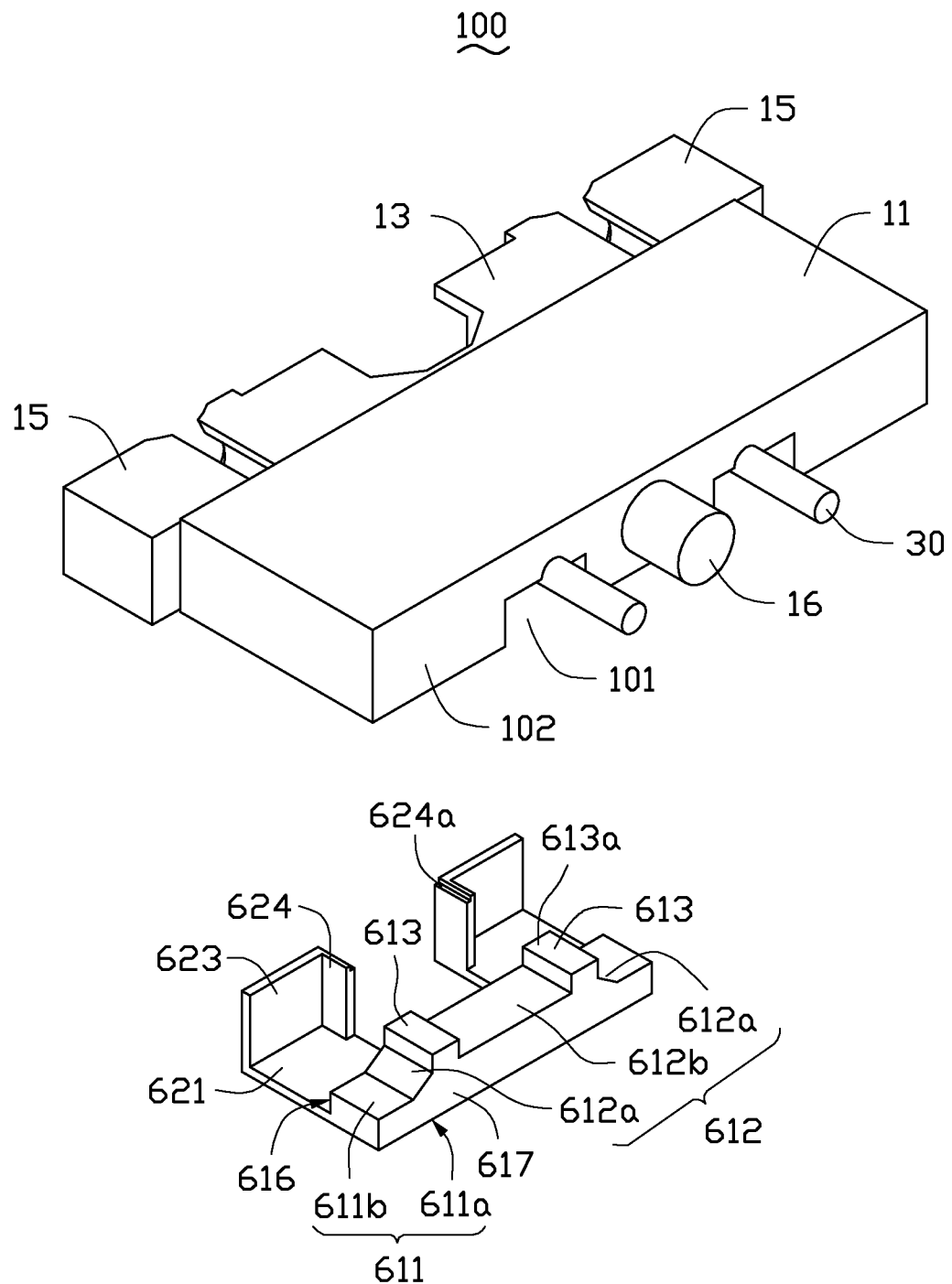
FIG. 3 is similar to FIG. 2, but viewed from another angle.
Figure 4:
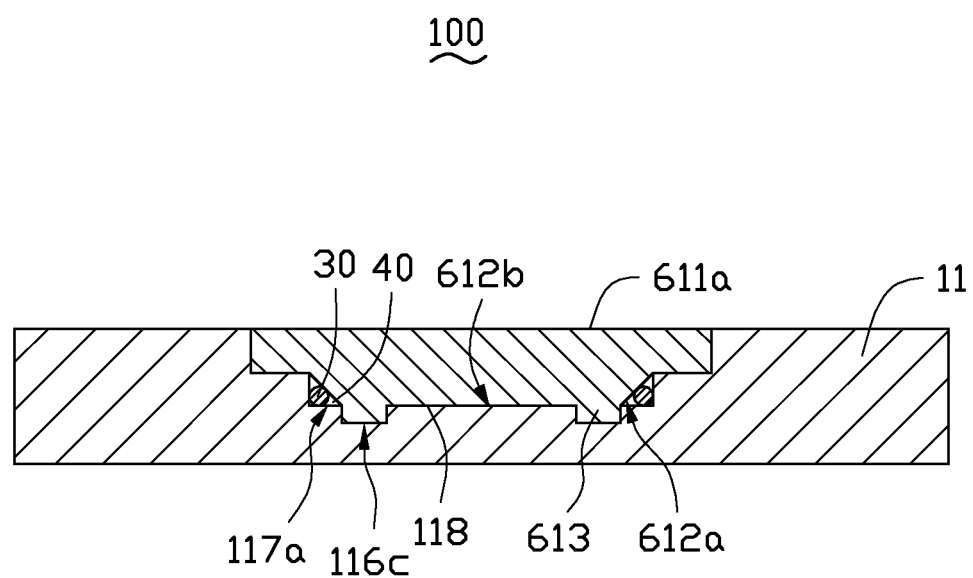
FIG. 4 is a sectional view of the optical fiber connector taken along the line IV-IV of FIG. 1.

Referring to FIGS. 2-3, the cover 60 includes an engaging member 61 and two shielding members 62. The shielding members 62 extend from opposite sides of the engaging member 61.

The engaging member 61 is shaped to be received in the recess 116 and may be adhered to the optical fiber receiving member 11 in the recess 116 with adhesive. The engaging member 61 may be made of material transparent to ultraviolet light so that ultraviolet light can be used to cure the adhesive. The engaging member 61 is insertably engaged in the recess 116. The insertion direction of the engaging member 61 is substantially perpendicular to longitudinal axes of the though holes 101.

The engaging member 61 includes a base 611, a connecting portion 612, and two protruding portions 613.

The base 611 is substantially a cuboid and includes a first plane surface 611a, a second plane surface 611b, a first sidewall 616, and a second sidewall 617. The first plane surface 611a is parallel to the second plane surface 611b. The first sidewall 616 is parallel to the second sidewall 617. The first plane surface 611a perpendicularly connects the first sidewall 616 to the second sidewall 617. The second plane surface 611b perpendicularly connects the first sidewall 616 to the second sidewall 617.

The connecting portion 612 has a trapezoid-shaped section along the longitudinal direction of the base 611 and extends from the second plane surface 611b. The connecting portion 612 includes two slanted pressing surfaces 612a and a third plane surface 612b arranged between the two slanted pressing surfaces 612a. The third plane surface 612b is parallel to the second plane surface 611b and connects the two slanted pressing surfaces 612a.

The protruding portions 613 extend from the third plane surface 612b and are arranged at opposite sides of the connecting portion 612. That is, the slanted pressing surfaces 612a connect the protruding portions 613 to the second plane surface 611b respectively. Each protruding portion 613 includes a fourth plane surface 613a parallel to the third plane surface 612b.

Each shielding member 62 includes a first plate 621, a second plate 623, and a third plate 624. The first plate 621 perpendicularly extends from the first sidewall 616. The second plate 623 and the third plate 624 perpendicularly extend from the first plate 621 and cooperatively form an L-shaped structure. The second plate 623 faces and is apart from the first sidewall 616. The third plate 624 is perpendicular to the second plate 623 and is apart from the first sidewall 616. An engaging groove 624a is defined in the third plate 624 configured to engage with the engaging plate 136. In this embodiment, the shielding member 62 is made of transparent material.

Referring to FIGS. 1-4, when the cover 60 is assembled to the connector body 10, the engaging member 61 seals the recess 116. The first plane surface 611a is coplanar with the upper surface 111. The positioning portion 117a cooperates with the slanted pressing surface 612a to define a receiving room 40 for receiving the distal portion 302 of the optical fiber 30. Two sides of the positioning portion 117a and the slanted pressing surface 612a abut the distal portion 302 of the corresponding optical fiber 30 so that the cover 60 and the supporting member 117 cooperatively and securely retain the distal portion 302 of the corresponding optical fiber 30 in the recess 116. The second plane surface 611b is supported on the supporting member 117. The protruding portion 613 is received in the gap 119. The fourth plane surface 613a abuts the bottom surface 116c. The third plane surface 612b abuts the isolating plate 118.

In addition, the two shielding members 62 respectively align with the two lenses 20. Taking one of the shielding members 62 as an example to describe the configuration of the shielding member 62. The first plate 621 abuts the optical lens member 13. The second plate 623 is supported on the corresponding support plate 135 and arranged in front of the corresponding lens 20. The third plate 624 engages with the corresponding engaging plate 136. The first plate 621 cooperates with the second plate 623, the third plate 624, the support portion 134, and the plug member 15 to form a sealed room for receiving the corresponding lens 20. Therefore, the lenses 20 are not easily broken and contaminated as the lenses 20 are not exposed to an external environment. This increases transmission efficiency and ensures the signal integrity.

In the present embodiment, the first plate 621 blocks dust from an upper area of the lens 20. The second plate 623 blocks dust from a front area of the lens 20. The third plate 624 and the engaging plate 136 cooperatively block dust from one side area of the lens 20. The plug member 15 blocks dust from the other side area of the lens 20. The support plate 135 blocks dust from a lower area of the lens 20. In another embodiment, the third plate 624 and the support portions 134 are omitted, and the plug members 15 are apart from the optical lens member 13. In this situation, only dust from the upper area and the front area of the lens 20 is blocked by the first plate 621 and the second plate 623.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An optical fiber connector comprising:
a connector body comprising an optical fiber receiving member and an optical lens member, the optical fiber receiving member including a front surface, a rear surface, an upper surface and a recess defined in the upper surface and exposed at the front surface, the optical lens member attached to the optical fiber receiving member, the optical lens member having a first surface and an opposite second surface facing the recess,
two lenses formed on the first surface;
two optical fibers received in the optical fiber receiving member with distal portions exposed in the recess and optically coupling with the respective lenses; and
a cover comprising an engaging member and two shielding members, the engaging member received in the recess, each shielding member comprising a first plate extending from the engaging member and a second plate perpendicularly extending from the first plate, the first plates covering the optical lens member, and the second plates covering the lenses.

2. The optical fiber connector as claimed in claim 1, further comprising two plug members arranged at opposite sides of the optical lens member, wherein two support portions extends from a lower end of the first surface, each shielding member further comprises a third plate perpendicularly connecting the first plate and the second plate, the second plate and the third plate are supported on the corresponding support portion; and the first plate, the second plate, the third plate, the support portion, and the plug member cooperate to form a sealed room receiving the corresponding lens.

3. The optical fiber connector as claimed in claim 2, wherein each support portion comprises a support plate and an engaging plate extending from the support plate, the second plate is supported on the support plate, and the third plate engages with the engaging plate.

4. The optical fiber connector as claimed in claim 3, wherein a cutout is defined in the middle of the first surface, and the two support plates are symmetrical to each other relative to the cutout.

5. The optical fiber connector as claimed in claim 3, wherein the connector body further comprises two supporting members received in the recess, the optical fiber receiving member defines two through holes, the optical fibers extend through the respective through holes, and the distal portions of the respective optical fibers are supported on the supporting member.

6. The optical fiber connector as claimed in claim 5, wherein each supporting member defines an L-shaped positioning portion, the engaging member comprising two slanted pressing surfaces, and the positioning portion and the slanted pressing surface cooperatively retain distal portions of the respective optical fibers in the recess.

7. The optical fiber connector as claimed in claim 5, wherein the through holes are parallel to each other, the engaging member is insertably engaged in the recess, and an insertion direction of the engaging member is substantially perpendicular to longitudinal axes of the through holes.

8. The optical fiber connector as claimed in claim 5, wherein the supporting members and the optical fiber receiving member are formed into a unitary piece.

9. The optical fiber connector as claimed in claim 5, wherein the optical fiber receiving member further comprises a lower surface parallel to the upper surface, the rear surface parallel to the front surface, the upper surface perpendicularly connects the front surface to the rear surface, and the lower surface perpendicularly connects the front surface to the rear surface.

10. The optical fiber connector as claimed in claim 9, wherein the through holes are defined in the rear surface and communicate with the recess.

11. The optical fiber connector as claimed in claim 9, wherein the connector body further comprises a handle, the handle extends from the rear surface away from the recess.

12. The optical fiber connector as claimed in claim 1, wherein the engaging member is adhered to the optical fiber receiving member in the recess with adhesive.

* * * * *